July 17, 1956  R. E. HAGER  2,755,423
ELECTRIC MOTOR CONTROL APPARATUS
Filed May 11, 1955
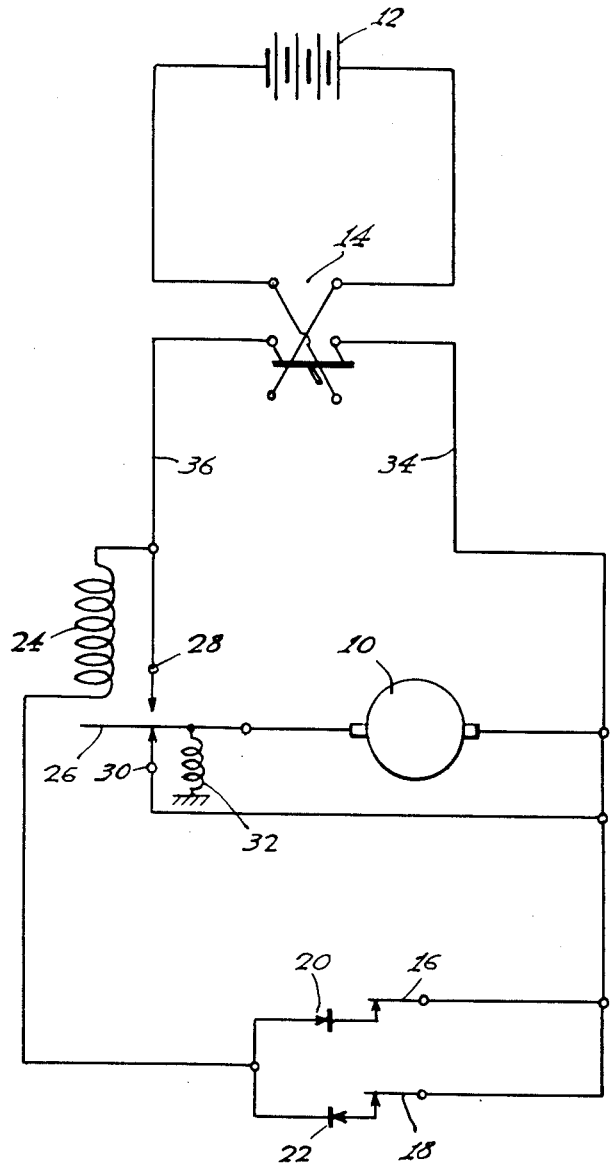
INVENTOR.
Robert E. Hager.
BY
ATTORNEY:-

United States Patent Office 2,755,423
Patented July 17, 1956

2,755,423

ELECTRIC MOTOR CONTROL APPARATUS

Robert E. Hager, Avalon, Pa., assignor to Gulf Research & Development Company, Pittsburgh, Pa., a corporation of Delaware Application May 11, 1955, Serial No. 507,600

3 Claims. (Cl. 318—261)

This invention concerns apparatus for controlling a reversible electric motor, and in patricular concerns apparatus for controlling a reversible motor which has, or whose load has, limits of motion.

In various applications of electric motors the motor drives a load which has limits of motion, as for example servomotors which may reach the end of their range. In such devices provision must be made to prevent jamming the associated gearing or load equipment when the limit of motion is reached. Desirably the limit-protection means should prevent consumption of power in the stationary motor. It is customary to employ limit switches which are mechanically actuated when the motor or its load reach their limits.

This invention concerns a circuit and apparatus for limit protection which is simple and reliable, which cuts off the motor current whenever the limit is reached, and which at the same time allows the motor to be reversed so as to retreat away from the limit whenever desired.

Accordingly, it is an object of this invention to provide control apparatus for a reversible electric motor which cuts off the electric power whenever a limit of travel is reached, which allows the motor to be reversed at will, and which is simple, reliable and has a minimum of components.

These and other objects of this invention are attained by the apparatus disclosed in this specification of which the drawing forms a part.

The drawing shows a schematic wiring diagram of the circuit employed in this invention. In the drawing, 10 represents the armature of an electric motor whose direction of rotation may be reversed by reversing the direction of current flow. The field (not shown) of the motor may be separately energized or may be a permanent magnet. By way of example the invention is described as applied to a direct-current motor driven from a D.-C. source 12 such as a battery. A double-pole double-throw reversing switch 14 permits stopping the motor or starting it in either direction provided the motor is not at a limit of travel. At each end of motor travel there is located a normally-closed single-pole, single-throw switch so arranged that upon reaching the limit of load travel, the corresponding limit switch is opened. In the figure, 16 represents one such switch which is automatically-mechanically opened by the motor or its load upon reaching the limit of motion in one direction, and 18 represents the other such switch which is automatically-mechanically opened by the motor or its load upon reaching the limit of motion in the other direction. In series with each limit switch 16 and 18 is a rectifier 20 and 22, each of which is connected so as to pass current only in one direction as will be explained later. The two circuits comprising respectively switch 16 and rectifier 20, and switch 18 and rectifier 22, are connected in parallel. This parallel circuit is connected in series with a relay coil 24, and this series circuit is connected across the lines 34 and 36 from the reversing switch 14.

The relay armature is a single-pole double-throw type with the movable contact 26 normally held in contact with stationary contact 30 by a spring 32. Upon energizing the relay coil 24 with current in either direction, the movable contact 26 is drawn away from contact 30 (against the tension of the spring 32) and into engagement with the other stationary contact 28. The motor armature is connected between movable contact 26 and the line 34 as shown. Contact 30 is also connected to line 34, and contact 28 is connected to line 36.

Thus whenever no power is applied to lines 34 and 36, the relay contacts 26 and 30 serve to short-circuit the motor armature 10, and this acts as a dynamic brake to promptly stop rotation of the motor whenever power is cut off.

If the motor is somewhere within its range of travel, both limit switches 16 and 18 are closed. The rectifiers are connected in opposite directions as shown. Therefore upon closing the switch 14 in either direction, current can flow through one of the parallel limit-switch branches, the relay coil 24 is energized, relay contact 26 connects to 28, and the motor will run in the direction corresponding to the direction of current flow effected by switch 14. When the limit of travel in this direction is reached the limit switch for example 16 is automatically opened. The rectifier 20 in series with this switch 16 is arranged so that it passes current in a direction for which the circuit effects rotation of the motor toward the limit 16. Accordingly, upon reaching this limit the switch 16 opens. Inasmuch as no current can flow through the othe rectifier because of its reverse connection, the relay coil is de-energized and the contact 26 drops back to contact 30. This cuts off the power from motor 10 and brakes the armature to a prompt stop. The motor can thus go no further toward this limit.

However, if it is desired to move the motor in the opposite direction the switch 14 is thrown over so as to reverse the polarity of leads 34 and 36. Current can now flow through rectifier 22 inasmuch as switch 18 is normally closed. Accordingly, the contact 26 is drawn up to 28 and the motor armature 10 is energized to run in the direction toward limit 18 and away from limit 16.

As soon as motor 10 has moved away from limit 16, control of its motion in either desired direction by appropriate throw of switch 14 is re-established by normal closure of switch 16. Of course, if the motor reaches limit 18, the switch 18 opens and then the motor may be run only toward the other limit (16). It is thus seen that the limits of motor travel are protected from mechanical injury and the motor is protected from electric over-heating due to stalling, whereas intermediate these limits the motor may be controlled in either direction at will.

While this invention has been described for a simple directional on-off control, it is contemplated that speed control may be incorporated. Thus, for example, a rheostat (not shown) may be connected in series with the motor armature 10 or the connection to contact 28 as is well known in the motor-control art. Also, if no braking action is desired, one may dispense with the relay contact 30 and use simply a normally-open, single-pole, single-throw relay.

What I claim as my invention is:

1. Apparatus for controlling the direction of rotation of a direct-current motor between limits of travel by application of a source of direct-current power which comprises a single-pole relay whose movable contact is normally held away from a stationary contact when the relay coil is de-energized, means for connecting the motor between the movable contact of the relay and a first terminal of the source, a normally-closed switch adapted to be opened whenever the motor reaches the limit of travel in one direction, a normally-closed switch adapted to be opened whenever the motor reaches the limit of travel in the other direction, a circuit connected to the power source, said circuit including the relay coil in series with two parallel branches each including in series one said limit switch and a rectifier, each said rectifier being connected to pass current of the direction which effects motor travel toward the limit switch in series therewith, and means for connecting the stationary contact of said relay to the second terminal of said source.

2. Apparatus for controlling the direction of rotation of a direct-current motor between limits of travel by application of a source of direct-current power which comprises a single-pole double-throw relay whose movable contact is normally held against a first stationary contact when the relay coil is de-energized, means for connecting the motor between the movable contact of the relay and a first terminal of the source, a normally-closed switch adapted to be opened whenever the motor reaches the limit of travel in one direction, a normally-closed switch adapted to be opened whenever the motor reaches the limit of travel in the other direction, a circuit connected to the power source, said circuit including the relay coil in series with two parallel branches each including in series one said limit switch and a rectifier, each said rectifier being connected to pass current of the direction which effects motor travel toward the limit switch in series therewith, means for connecting the first stationary contact of said relay to the first terminal of said source, and means for connecting the second stationary contact of said relay to the second terminal of said source.

3. Apparatus for controlling the direction of rotation of a direct-current motor between limits of travel by application of a source of direct-current power which comprises a single-pole relay whose movable contact is normally held away from a stationary contact when the relay coil is de-energized, means for connecting the motor between the movable contact of the relay and a first terminal leading to the source, a normally-closed switch adapted to be opened whenever the motor reaches the limit of travel in one direction, a normally-closed switch adapted to be opened whenever the motor reaches the limit of travel in the other direction, a circuit connected to first and second terminals leading to the source, said circuit including the relay coil in series with two parallel branches each including in series one said limit switch and a rectifier, each said rectifier being connected to pass current of the direction which effects motor travel toward the limit switch in series therewith, means for connecting the stationary contact of said relay to the second terminal leading to said source, and means for reversing the connection of said first and second terminals to the power source.

References Cited in the file of this patent
UNITED STATES PATENTS
2,397,557   McCoy _____ Apr. 2, 1946